US012565971B1

(12) United States Patent
Deng

(10) Patent No.: US 12,565,971 B1
(45) Date of Patent: Mar. 3, 2026

(54) HIGH-VOLTAGE PLUG-IN LIGHT STRING WITH INTEGRATED LED BULBS AND METHOD OF MAKING THEREOF

(71) Applicant: DONGGUAN YONGFENG LIGHTING CO., LTD, Dongguan (CN)

(72) Inventor: Zhumei Deng, Guangdong (CN)

(73) Assignee: Dongguan Yongfeng Lighting Co., Ltd, Dongguan (CN)

( * ) Notice: Subject to any disclaimer, the term of this patent is extended or adjusted under 35 U.S.C. 154(b) by 0 days.

(21) Appl. No.: 18/917,833

(22) Filed: Oct. 16, 2024

(51) Int. Cl.
*F21S 4/10* (2016.01)
*F21Y 103/10* (2016.01)
*F21Y 113/00* (2016.01)
*F21Y 115/10* (2016.01)

(52) U.S. Cl.
CPC ............ *F21S 4/10* (2016.01); *F21Y 2103/10* (2016.08); *F21Y 2113/00* (2013.01); *F21Y 2115/10* (2016.08)

(58) Field of Classification Search
CPC ........................................................ F21S 4/10
See application file for complete search history.

(56) References Cited

U.S. PATENT DOCUMENTS

| | | | | |
|---|---|---|---|---|
| 10,941,923 | B1 * | 3/2021 | Wu | F21V 19/0055 |
| 11,432,388 | B1 * | 8/2022 | Altamura | H05B 45/48 |
| 11,499,700 | B1 * | 11/2022 | Tsai | F21S 4/10 |
| 11,802,685 | B1 * | 10/2023 | Hitt | F21V 23/06 |
| 12,345,382 | B1 * | 7/2025 | Liang | F21S 4/10 |
| 2022/0403989 | A1 * | 12/2022 | Leung | H01R 33/9658 |
| 2025/0164097 | A1 * | 5/2025 | Yu | F21V 19/0005 |
| 2025/0180177 | A1 * | 6/2025 | Roznovsky | F21S 4/10 |

* cited by examiner

*Primary Examiner* — Christopher E Dunay
(74) *Attorney, Agent, or Firm* — Enable IP, P.C.

(57) ABSTRACT

A method of making a first light assembly of a string light is disclosed, the method includes providing a bulb, a first wire, and a second wire, each of the first and second wires has an exposed end; connecting the exposed ends of the first and second wires to the bulb; inserting an inner insert in a space between the first and second wires where the first and second wires converge; encapsulating the first and second wires using a heat shrink tube where the exposed ends of the first and second wires are connected to the bulb; and affixing a lamp holder around the bulb and a portion of the first and second wires and on top of the inner insert to secure at least a portion of the bulb within the lamp holder.

8 Claims, 5 Drawing Sheets

HIGH-VOLTAGE PLUG-IN LIGHT STRING WITH INTEGRATED LED BULBS AND METHOD OF MAKING THEREOF

FIELD

This relates generally to string lights, and more particularly, to a high-voltage plug-in light string with integrated light-emitting diode (LED) bulbs and a method of making such string lights.

BACKGROUND

Traditional light strings with mini tungsten filament bulbs have been around for a long time. Improved light strings and methods of making light strings are desired.

SUMMARY

In one aspect, this disclosure relates to a high-voltage plug-in light string with integrated LED bulbs. In another aspect, the disclosure relates to a method of making such high-voltage plug-in light string with integrated LED bulbs.

DETAILED DESCRIPTION

Embodiments of the present disclosure will be described below in conjunction with the accompanying drawings, but it should be appreciated by those skilled in the art that the embodiments described below are exemplary, rather than exhaustive. They are only used to illustrate the present disclosure and should not be regarded as limiting the scope of the present disclosure. All other embodiments obtained by those of ordinary skill in the art without creative efforts based on the embodiments disclosed herein shall fall within the scope of the present disclosure.

Figure 1B:
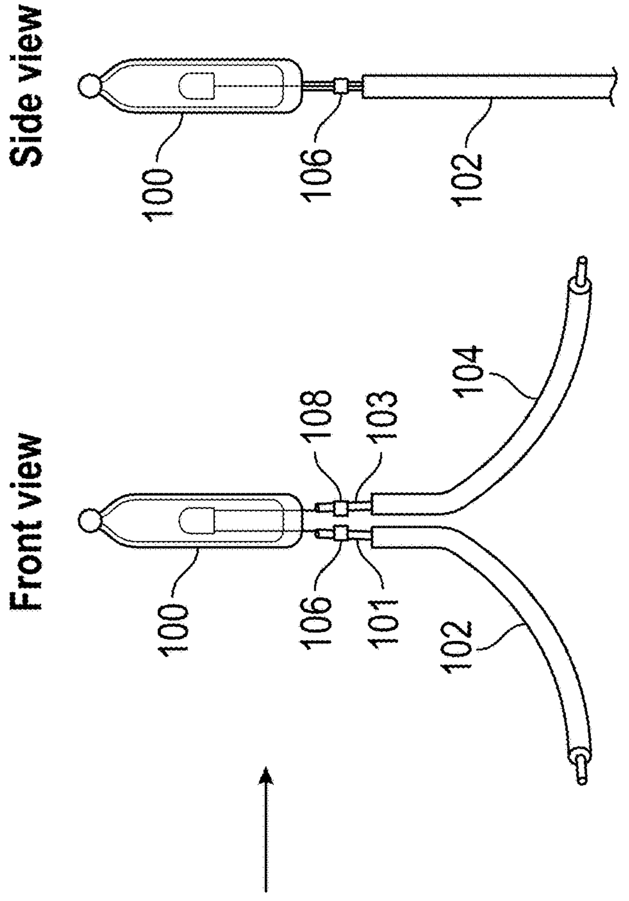
FIGS. 1*a*-1*i* illustrate the exemplary steps in manufacturing a high-voltage plug-in light string with integrated LED bulbs, according to an embodiment of the disclosure.
Figure 1A:
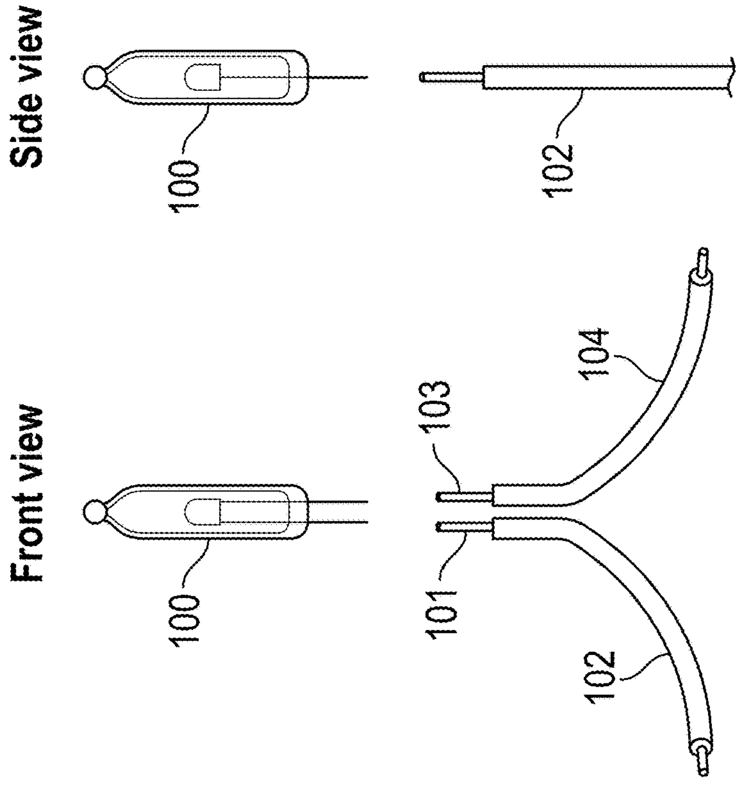

FIGS. 1*a*-1*i* illustrate the exemplary steps in the making of a high-voltage plug-in light string using integrated LED glass bulbs, according to an embodiment of the disclosure. First, as illustrated in FIG. 1*a*, an integrated LED glass bulb 100 and two wires 102, 104 each with a striped end 101, 103 are provided. As shown, the wires 102, 104 can be insulated other than at the striped ends 101, 103.

Next, as illustrated in FIG. 1*b*, the integrated LED glass bulb 100 is connected to the striped ends 101, 103 of the two wires 102, 104 in series by welding, using riveting metal connectors 106, 108 as shown in FIG. 1*b*, or any other suitable means.

Figure 1D:
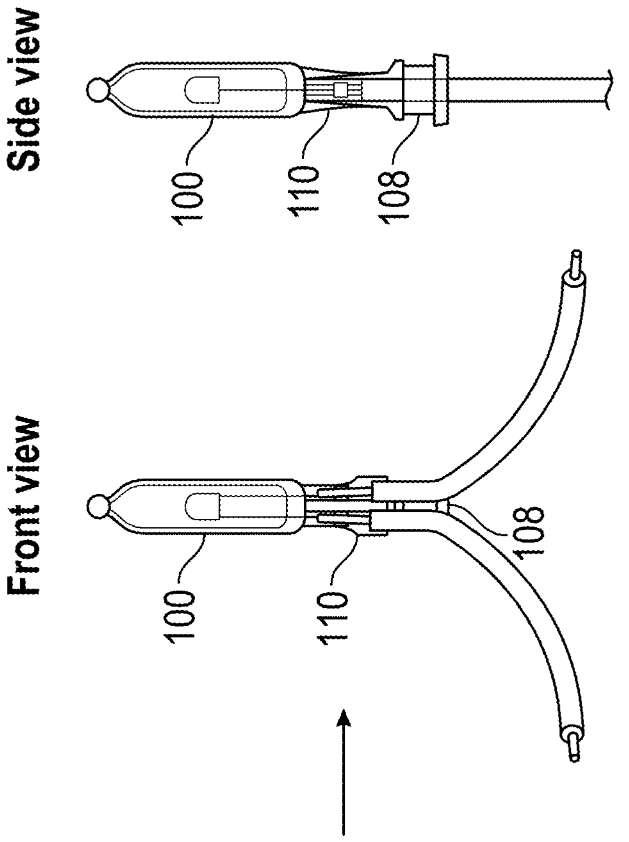
Figure 1C:
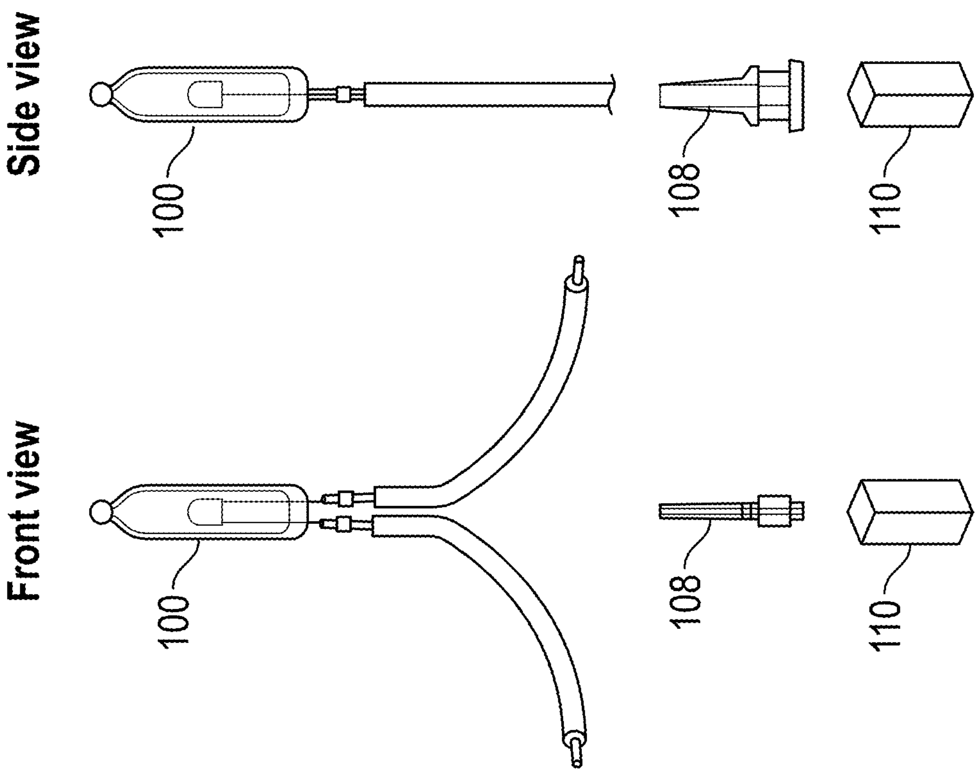

Next, as illustrated in FIG. 1*c*, an inner insert 108 and a heat shrink tube 110 can be provided. As illustrated in FIG. 1*d*, the inner insert 108 is inserted in a space between the two wires 102, 104 where the wires 102, 104 converge. The heat shrink tube 110 can encapsulate the wires 102, 104 where the exposed ends of the wires 102, 104 are connected to the LED glass bulb 100.

Figure 1F:
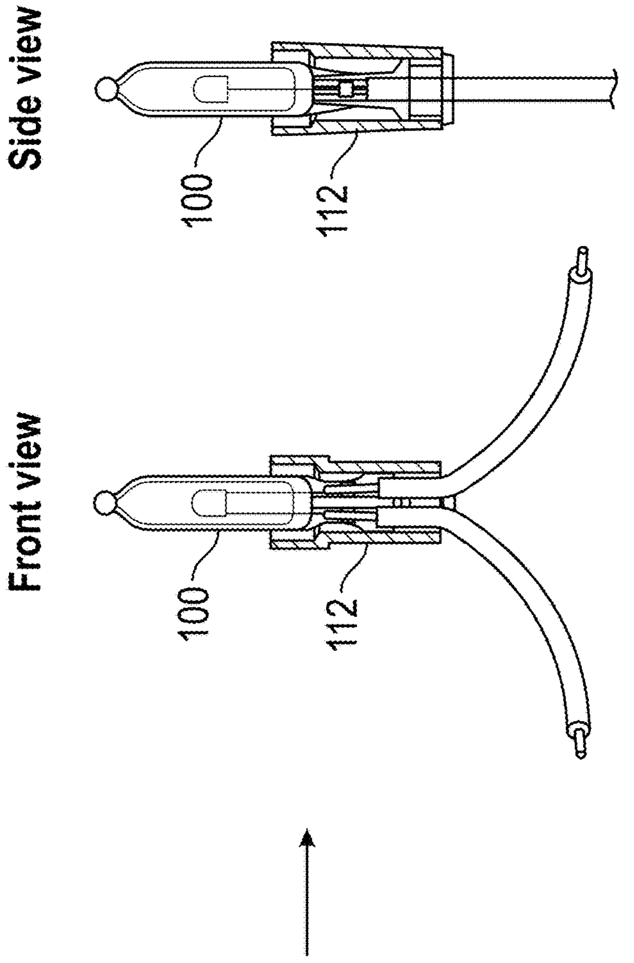
Figure 1E:
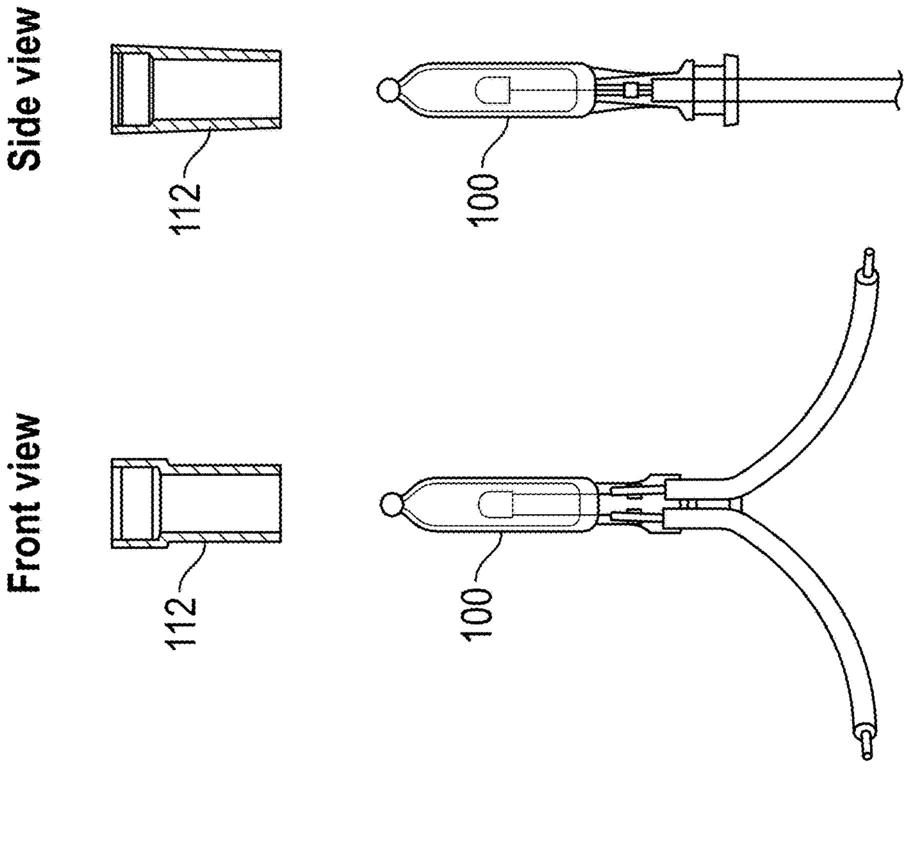

As shown in FIG. 1*e*, a lamp holder 112 is provided. As shown in FIG. 1*f*, the lamp holder 112 is added onto the light assembly of FIG. 1*d* with the inner insert 108 fixed on the lamp holder (as shown in the side view) to secure at least a portion of the bulb 100 (e.g., the bottom portion) within the lamp holder 112.

Figure 1H:
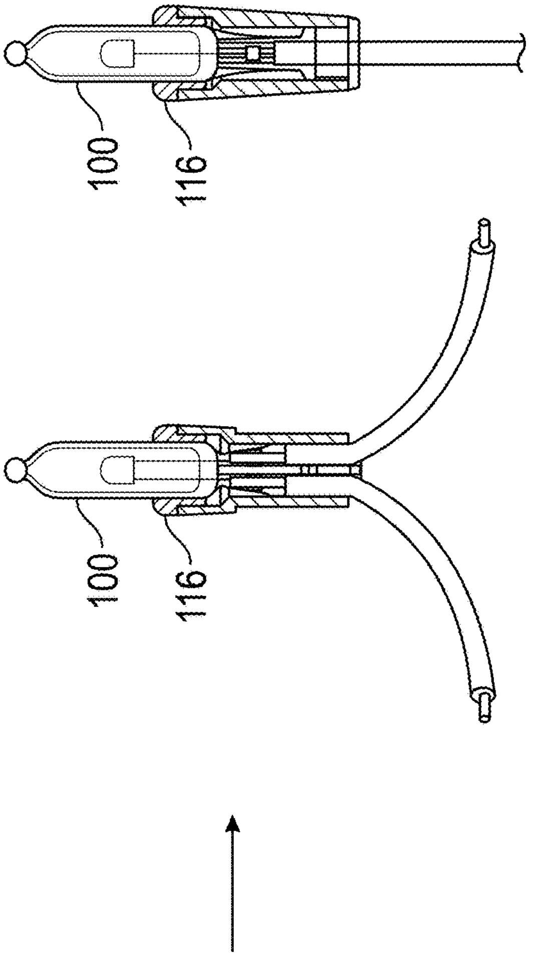
Figure 1G:
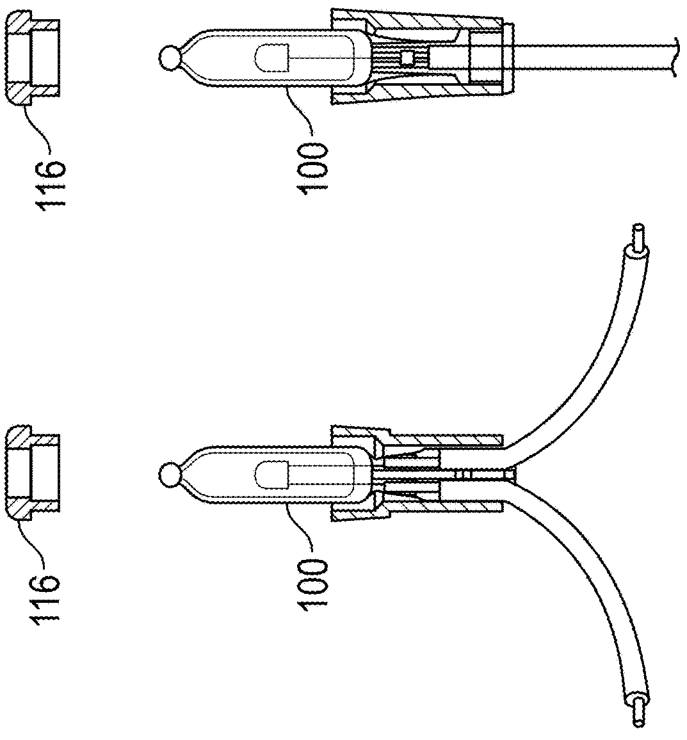

FIG. 1*g* illustrates a lamp collar 116. As shown in FIG. 1*h*, the lamp collar 116 is added to the lamp assembly of FIG. 1*f*. Specifically, the lamp collar 116 is affixed between the upper opening of the lamp holder 112 and the bulb 100 such that at least a part of the lamp collar 116 is between the lamp holder 112 and the bulb 100.

Figure 1I:
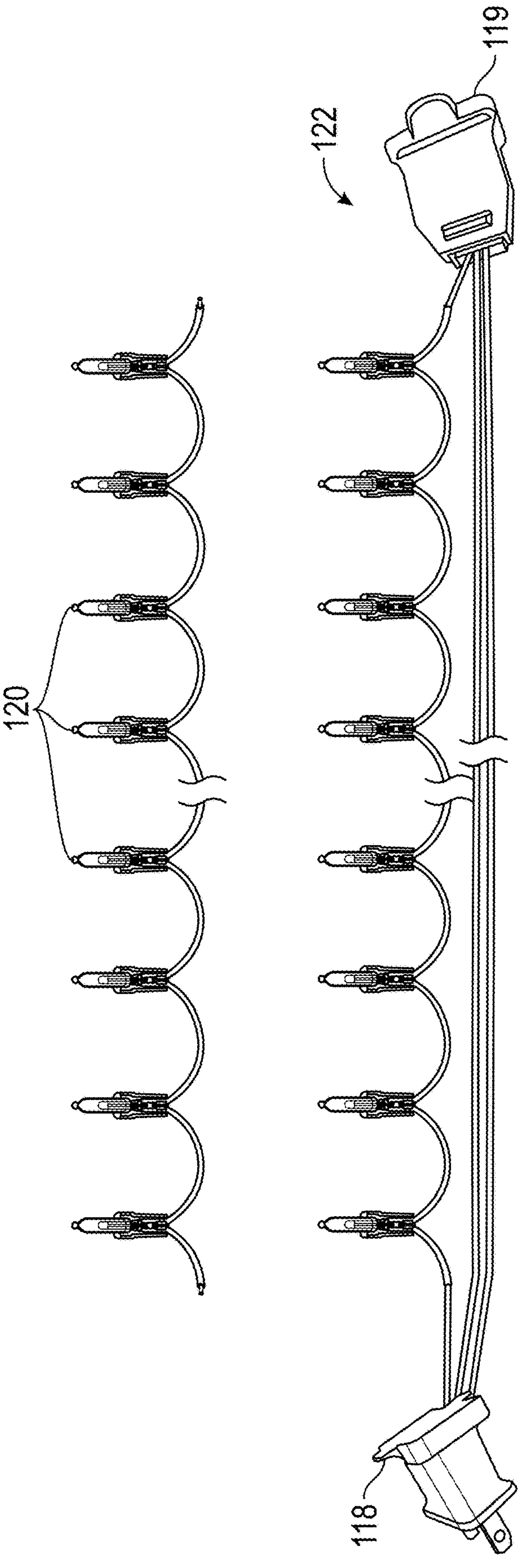

Finally, as shown in FIG. 1*i*, multiple light assemblies (collectively 120) of FIG. 1*h* are connected in series, and then connected in parallel through the front and rear plugs 118, 119 to form a complete light string 122.

The light string assembled using the method shown in the figures and described above can be a high-voltage plug-in light string using integrated LED glass bulbs to replace the traditional mini tungsten filament bulbs light string.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. A method of making a first light assembly of a string light, the method comprising:

providing a bulb, a first wire, and a second wire, each of the first and second wires has an exposed end;

connecting the exposed ends of the first and second wires to the bulb;

inserting an inner insert in a space between the first and second wires where the first and second wires converge;

encapsulating the first and second wires using a heat shrink tube where the exposed ends of the first and second wires are connected to the bulb;

affixing a lamp holder around the bulb and a portion of the first and second wires and on top of the inner insert to secure at least a portion of the bulb within the lamp holder; and affixing a lamp collar between an upper opening of the lamp holder and the bulb such that at least a part of the lamp collar is between the lamp holder and the bulb.

2. The method of claim 1, wherein the striped ends of the first and second wires are connected to the LED bulb by welding.

3. The method of claim 1, wherein the striped ends of the first and second wires are connected to the LED bulb by riveting metal connectors.

4. The method of claim 1, wherein the bulb is an LED bulb.

5. The method of claim 1, further comprising connected the first light assembly with a second light assembly in series to form a string light.

6. The method of claim 5, further comprising adding a front plug and a rear plug to the light string.

7. The method of claim 1, wherein the at least a part of the lamp collar is between an inner surface of the lamp holder and an outer surface of the bulb.

8. A light assembly of a string light comprising:

a bulb;

a first wire and a second wire, each connected to the bulb in series;

an inner inserted in a space between the first and second wires where the first and second wires converge;

a heat shrink tube encapsulating the first and second wires where the exposed ends of the first and second wires are connected to the bulb;

a lamp holder affixed around the bulb and a portion of the first and second wires and on top of the inner insert to secure at least a portion of the bulb within the lamp holder; and a lamp collar affixed between an upper opening of the lamp holder and the bulb such that at least a part of the lamp collar is between the lamp holder and the bulb.

* * * * *